United States Patent [19]

Turner et al.

[11] 4,050,300
[45] Sept. 27, 1977

[54] TORQUE INDICATING ASSEMBLY

[75] Inventors: John W. Turner; Russell A. McLaughlin, both of Houston, Tex.

[73] Assignee: Joy Manufacturing Company, Pittsburgh, Pa.

[21] Appl. No.: 681,870

[22] Filed: Apr. 28, 1976

[51] Int. Cl.² .............................................. G01L 5/24
[52] U.S. Cl. ............................................. 73/139; 73/143
[58] Field of Search ................... 73/136 R, 139, 143, 73/141 R

[56] References Cited

U.S. PATENT DOCUMENTS

| | | | |
|---|---|---|---|
| 1,907,461 | 5/1933 | Sunde | 73/139 |
| 2,190,967 | 2/1940 | Zimmerman | 73/139 |
| 2,272,610 | 2/1942 | Kreiger et al. | 73/139 |
| 2,300,288 | 10/1942 | Hullhorst | 73/136 R |
| 2,527,456 | 10/1950 | Schmeling | 73/139 |
| 3,285,070 | 11/1966 | McDonough | 73/141 R X |

Primary Examiner—Charles A. Ruehl
Attorney, Agent, or Firm—George Patrick Baier

[57] ABSTRACT

A torque indicator assembly and more particularly an improved torque indicator assembly offering multiple use applications and improved long range consistency and operational characteristics.

8 Claims, 5 Drawing Figures

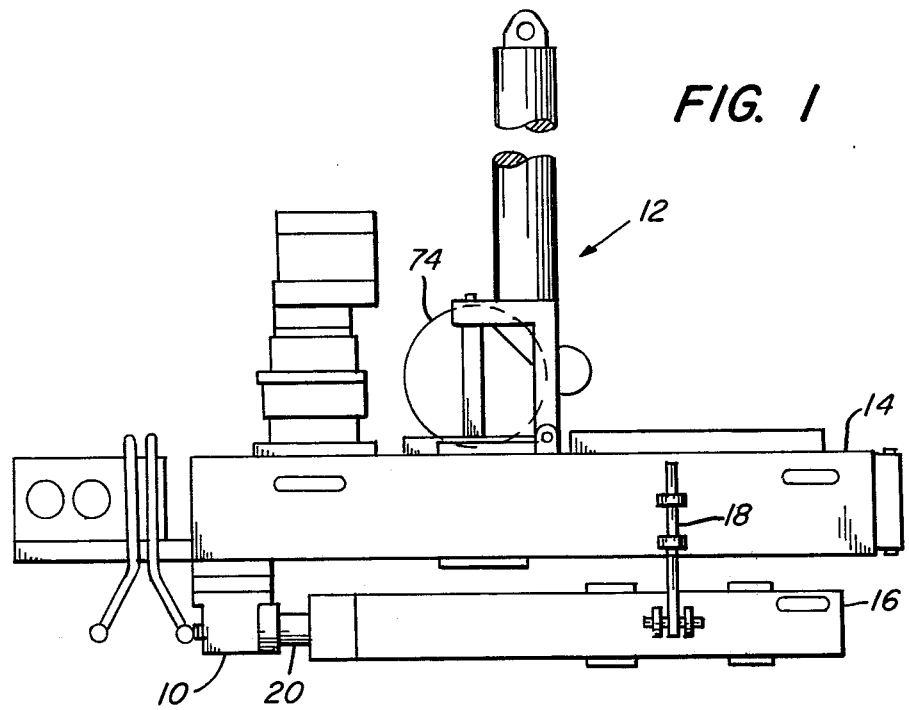
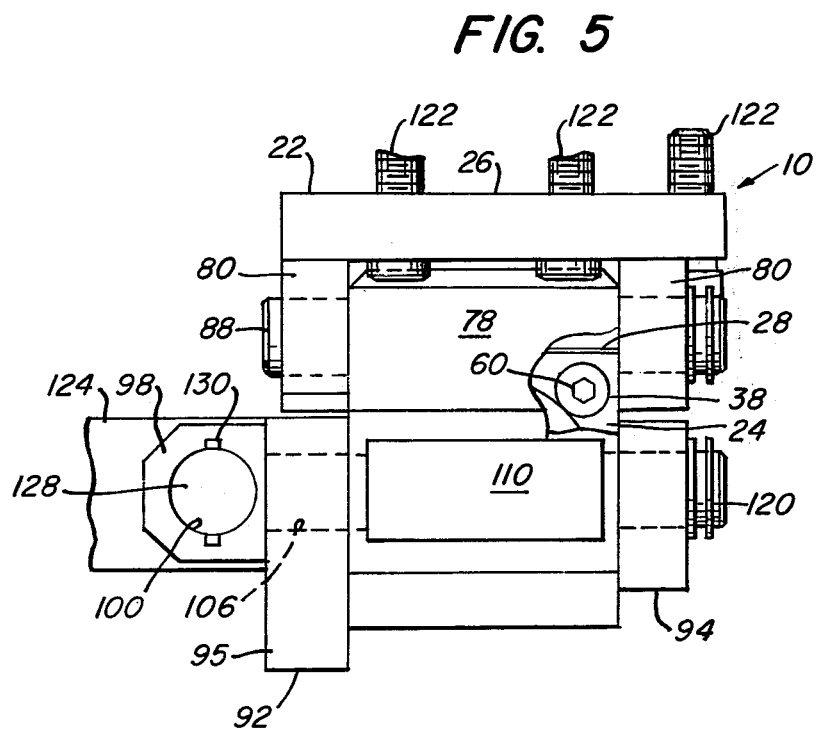

TORQUE INDICATING ASSEMBLY

One type of torque indicator assembly utilized heretofore has been incorporated within the structure of a torque applying device. Such an assembly quite often utilized a spring biased arrangement wherein the applied torque was transmitted to a mechanical linkage to obtain an applied torque readout. This biased arrangement may be limited in accuracy due to differential spring rates, from one spring to another, and wear conditions which may develop in the linkage. Furthermore, inasmuch as the spring bias unit is an integral part of the torque applying device, multiple use applications are quite limited and susceptible to accuracy problems.

Other types of the torque indicator assemblies which have been used heretofore are applied in series with an external tension member which is responsive to torque applied to a working member. With such an arrangement the tensile force in the tension member is detected in the torque indicator and by predetermined calibrations an applied torque can be read directly. Once again this type of unit has a disadvantage in attempting to apply it to multiple use applications.

Torque indicating devices of the types described hereinabove have been utilized in oil field applications with power makeup and breakdown tongs. In such applications the latter type torque indicator might be used on the backup cable for the power tong and the former type torque indicator might be used as an integral part of the power tong.

By means of the present invention which includes a simplified assembly utilizing a force-volume relationship and which may act as either a tension or torque transmitting assembly the above-described deficiencies of prior devices are generally alleviated. The assembly of the present invention is releasably secured to a power tong or other torque transmitting assembly.

These and other objects and advantages of the present invention will become more readily apparent from a reading of the following description and drawings in which:

FIG. 1 is a schematic illustration of a power and backup tong assembly which incorporates a torque indicating assembly constructed in accordance with the principles of the present invention;

FIG. 5 is a reduced size side elevational view, partly in section, of a torque indicating assembly taken on line 5—5 of FIG. 2.

Figure 2:
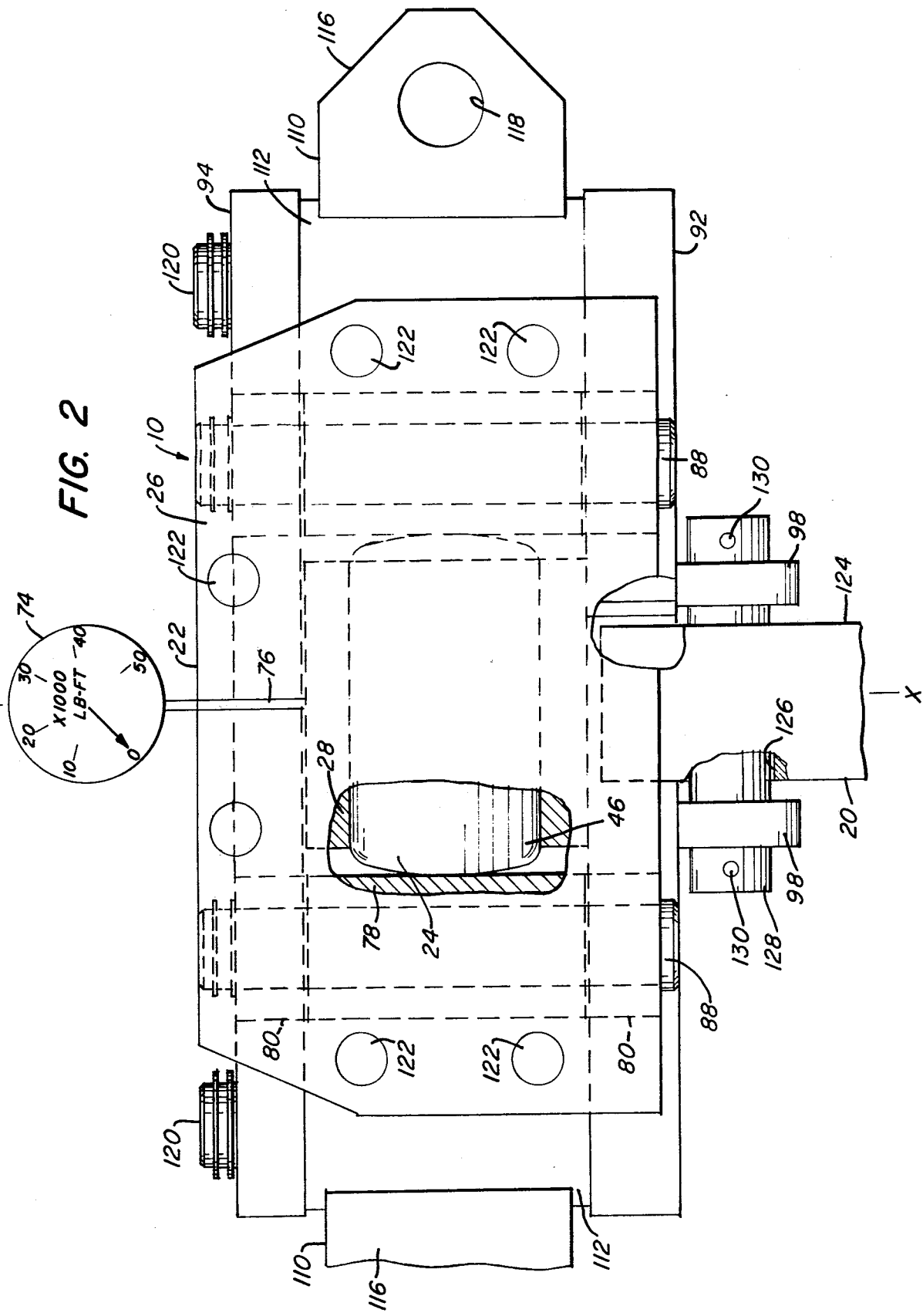
FIG. 2 is a plan view, partly in section, of a torque indicating assembly of the present invention which is schematically illustrated in FIG. 1.

A torque indicating assembly, generally indicated at 10, which is constructed in accordance with the principles of the present invention may be utilized in various operational conditions, one of which is illustrated at FIG. 1 with an oil well power and backup tong assembly 12. Assembly 12 comprises a suitable drill pipe power tong 14 which carries a backup tong 16 therefrom. Tongs 14 and 16 are of any suitable construction and as illustrated backup tong 16 is supported from power tong 14 by releasable side support assemblies 18 and a rear connection assembly 20 which communicates between tong 16 adjacent the rearward end thereof and torque indicating assembly 10. Torque indicating assembly 10 extends downwardly from power tong 14 and is releasably secured thereto adjacent the rearward end thereof in a manner described hereinafter.

With a unit such as assembly 12 the backup tong 16 is carried by the power tong 14 to oppose the rotational reaction force of the power tong 14 when making up or breaking out of a threaded pipe joint. The assembly 12 prevents the free spinning of the pipe. In operation the tongs 14 and 16 grip adjacent pieces of pipe or collars being coupled or uncoupled. The resultant torque from tong 14 is transmitted through indicating assembly 10 to backup tong 16. Accordingly a continuous reading of applied torque is readily obtainable as will be fully described hereinafter. Furthermore, in instances where backup tong 16 is not used means are included within indicating assembly 10 for direct connection to a backup cable (not shown) as an alternative means for monitoring torque applied by the power tong 14.

Tong assemblies such as power tong 14 and backup tong 16 are generally well known in the art. Accordingly, further detailed description of these assemblies will not be set forth hereinafter except where necessary to describe the invention herein.

Torque indicating assembly 10 comprises: a main body portion 22 which releasably receives a variable volume chamber assembly 24 therewithin. Main body portion 22 comprises: an upper generally planar plate portion 26; and a chamber receiving portion 28 which is integrally formed with plate portion 26 and depends downwardly therefrom. Chamber receiving portion 28 is of a generally block-like configuration is centrally located with respect to plate portion 26 and peripherally spaced from the outer periphery of plate portion 26. For purposes of description hereinafter forward and rearward shall refer respectively to towards and away from the front face of assembly 10 as viewed in FIG. 4 and inner and outer shall refer respectively to towards and away from the transverse rearwardly extending center line X—X indicated in FIG. 2.

Figure 3:
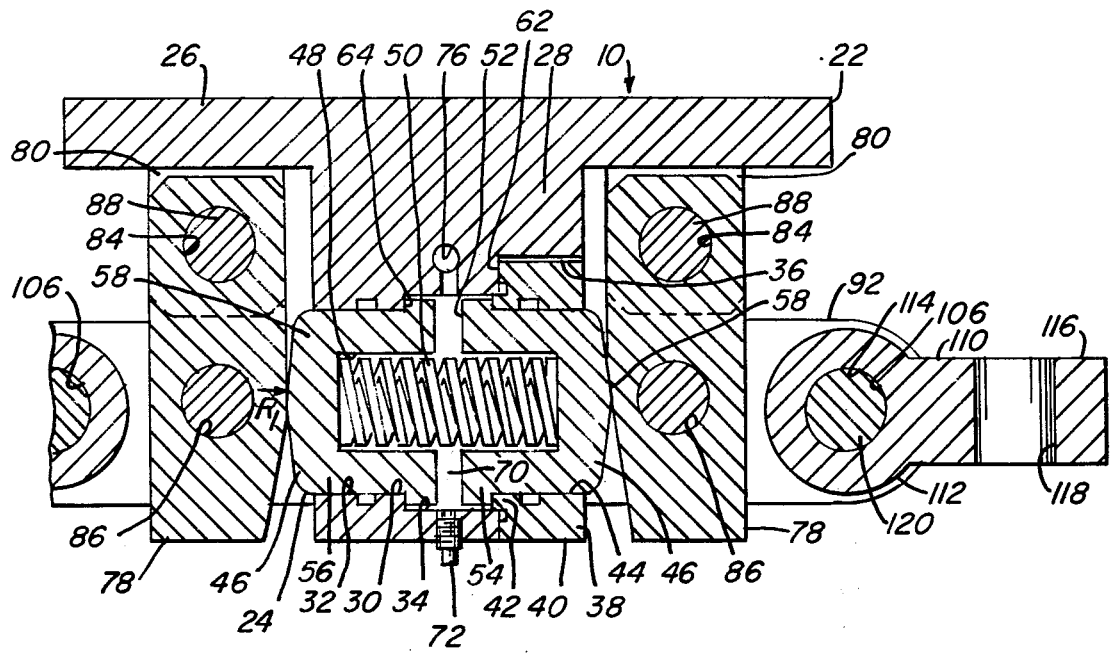
FIG. 3 is a reduced size longitudinal cross-section view of the torque indicating assembly taken on lines 3—3 of FIG. 2.

As is best illustrated in FIG. 3 chamber receiving portion 28 includes a horizontally extending stepped opening 30 therethrough adjacent the lowermost end thereof. Opening 30 extends in a direction generally perpendicular to the extent of axis X—X and as shown comprises a reduced diameter cylindrical bore portion 32 adjacent one end of opening 30; a central cylindrical bore portion 34 having a diameter thereof larger than the diameter of bore portion 32; and an enlarged generally polygonal opening portion 36 adjacent the other end of portion 30 which has the outer periphery thereof spaced from the periphery of bore portion 32. As will be discussed immediately hereinafter opening 30 receives chamber assembly 24 therewithin and chamber assembly 24 is retained within opening 30 by pressure end cap 38.

End cap 38 comprises: a main generally polygonal body portion 40 having an axial length thereof substantially equal to the axial length of the opening portion 36 and an outer periphery thereof substantially identical to the periphery of opening portion 36; and a cylindrical inner end portion 42 which has an outer diameter thereof substantially equal to the diameter of bore portion 36. End cap 38 additionally includes a coaxial through bore 44 therethrough of a diameter equal to the diameter of bore portion 32.

Chamber assembly 24 comprises a pair of coaxially aligned oppositely extending piston members 46 each of which include a coaxially inwardly open outwardly extending blind bore 48 therewithin. A biasing means such as spring 50 is coaxially received within bores 48 and is of a sufficient length to normally maintain a space between the innermost surfaces 52 of the adjacent piston members 46. Piston members 46 are each of a generally stepped cylindrical configuration and as shown include: an inner flange portion 54 having an outer diameter thereof intermediate the diameter of bore portions 32 and 34; and a main body portion 56 having an outer diameter thereof substantially equal to the diameter of bore portion 32 and bore 44. The outermost end surface 58 of body portion 56 has a generally convex configuration.

With the configuration as described hereinabove chamber assembly 24 is coaxially received within the opening 30 of portion 28. End cap 38 is positioned around the adjacent piston member 46 and releasably secured in such assembled position in any suitable manner, for example a plurality of bolts 60 (only one being shown in FIG. 5) which communicate between end cap 38 and main body portion 22. As can be seen in FIG. 3 when assembly 24 is retained within opening 30 the convex outermost surfaces 58 of piston members 46 extend outwardly from the respective receiving openings. Furthermore, the annular innermost axial end surface 62 of end cap 38 and the annular surface 64 at the abuting ends of bore portions 32 and 34 are equidistant from the centerline X—X. Accordingly, the spring 50 biases piston members 46 an equal distance from the centerline X—X until the respective outer annular surfaces of flange portion 54 engage the respective axial end surface 62 or annular surface 64.

A pressure chamber 70 is defined intermediate the spaced piston members 46 by the volume occupied by the blind bores 46 plus the volume bounded by the surfaces 52, the outer periphery of flange portions 54 and the intermediate bore portions 34. The pressure chamber 70 may be charged with hydraulic pressure fluid in any suitable manner, for example, a plug 72 communicating with chamber 70 adjacent the forward end of indicating assembly 10. As will be described hereinafter, in operation forces responsive to applied torque of a working assembly will result in the compression of the chamber 70 and the resulting pressure differential within chamber 70 will be directly proportional to such applied torque. Accordingly, suitable means, such as a schematically illustrated meter assembly 74 (which may be calibrated to read directly in foot pounds) is provided. Meter assembly 74 communicates with pressure chamber 70 in any suitable manner, for example bore 76 which openly communicates with chamber 70. Specifics as to the manner in which torque responsive forces are applied to the chamber assembly 24 are described hereinafter.

Torque indicating assembly 10 additionally includes a transversely spaced pair of pressure plates 78 pivotally supported from the plate portion 26 of main body portion 22. Plate portion 26 includes a pair of downwardly extending axially spaced connecting lugs 80 on the forward and rearward sides thereof for the pivotal support of pressure plates 78. Each connecting lug 80 includes a bore 82 therethrough and the lugs 80 are positioned in a manner that the bores 82 of lugs 80 on adjacent sides of the plate portion 26 are coaxially aligned. Each pressure plate 78 has a generally rectangular configuration and includes upper and lower bores 84 and 86, respectively, therethrough. Bores 84 and 86 extend longitudinally through plates 78 generally in the direction of axis X—X.

In assembly, plates 78 are positioned intermediate a respective aligned pair of lugs 80 in a manner that the respective upper bores 84 of plates 78 are coaxially aligned with the lug bores 82. After such alignment, upper pivot pins 88 are inserted through the aligned bores 82 and 84 and retained in position in any suitable manner, for example a cotter pin or pressed washers. Plates 78 will then be pivotally supported in a manner that the forward and rear ends thereof and the lowermost extent thereof all are substantially in alignment with corresponding sides of chamber receiving portion 28. Also a portion of the innermost surface 90 of each plate 78 engages the adjacent surface 58 of a respective piston member 46.

Pressure plates 78 are maintained in the above-described position and reactive forces are transmitted by such plates 78 to the chamber assembly 24 by means of elongated front and rear link plates 92 and 94, respectively, which extend horizontally in a direction generally normal to axis X—X and are pivotally carried by the pressure plates 78 adjacent a lower end portion thereof.

Front link plate 92 comprises: an elongated generally yoke like main body member 95; a centrally located upwardly open transversely extending U-shaped opening 96 within member 95; a pair of axially spaced forwardly extending connecting lugs 98, one of which lug 98 is adjacent each side of opening 96 and which each include coaxially aligned transversely extending bores 100 therethrough; a pair of longitudinally spaced transversely extending bores 102 through member 95 with the longitudinal spacing of bores 102 equalizing the spacing between bores 86 of the adjacent pressure plates 78; and a pair of longitudinally spaced cable link connecting bores 104 extending transversely through member 95 adjacent the respective axial ends thereof. Rear link plate 94 is of a generally rectangular configuration and includes therein a pair of longitudinally spaced transversely extending cable connecting bores 106 with the longitudinal spacing of bores 106 equal to the longitudinal spacing between bores 104 of front link 92. Rear link plate 94 additionally includes a pair of longitudinally spaced transversely extending bores therein (not shown) which have a longitudinal spacing thereof equal to the longitudinal spacing between bores 102 of front link plate 92.

In assembly, front link plate 92 is positioned forwardly adjacent pressure plates 78 and rear link plate 94 is positioned rearwardly adjacent the pressure plates 78. The bores 102 are coaxially aligned with the respective lower bores 86 of the pressure plates 78 and with a corresponding transverse bore extending through the rear link plate 94. After such alignment, lower pivot pins 108 are inserted through the coaxially aligned bores and retained in position in any suitable manner, for example cotter pin or pressed washers.

Cable connection assemblies 110 are additionally pivotally supported between link plates 92 and 94. Cable connection assembly 110 comprises a generally cylindrical connecting portion 112 having a coaxial bore 114 therethrough and a cable connecting lug 116 extending outwardly from connecting portion 112. Lug 116 includes a vertical bore 118 therethrough. When assembling link plates 92 and 94 as discussed hereinabove bores 114 are coaxially aligned with respective cable link connecting bores 104 and 106 and a cable link pivot pin 120 is inserted within each set of such coaxially aligned bores. Pivot pins 120 are retained in position in any suitable manner.

In operation torque indicating assembly 10 is suitably secured to a torque applying device. In the particular embodiment illustrated in FIG. 1, assembly 10 is removably secured to the underside of power tong 14 by means of a plurality of bolts 122 (shown as six bolts 122) which communicate between plate portion 26 and power tong 14. The rotational reaction force of power tong 14 is transmitted through assembly 10 to the rear connection of backup tong 16. The backup tong 16 opposes the rotational reaction force of the power tong 14 when making up or breaking out of a threaded joint of pipe.

The rear connection assembly 20 of the backup tong 16 comprises an elongated rearwardly extending cylindrical member 124 which includes a transverse bore 126 therethrough forwardly adjacent the rearward end thereof. When utilizing a backup tong 16 in conjunction with a power tong 14, bore 126 is coaxially aligned with bores 100 of connecting lugs 98 and a pivot pin 128 is received within such coaxially aligned bores. Pivot pin 128 is retained in position in any suitable manner, for example, cotter pins 130. It is to be noted that in assembled position the rear end of member 124 is received within U-shaped opening 96. Furthermore, the diameter of bore 126 is slightly larger than the diameter of pivot pin 128 thereby permitting a limited transverse angular movement of member 124 with respect to pivot pin 128.

Figure 4:
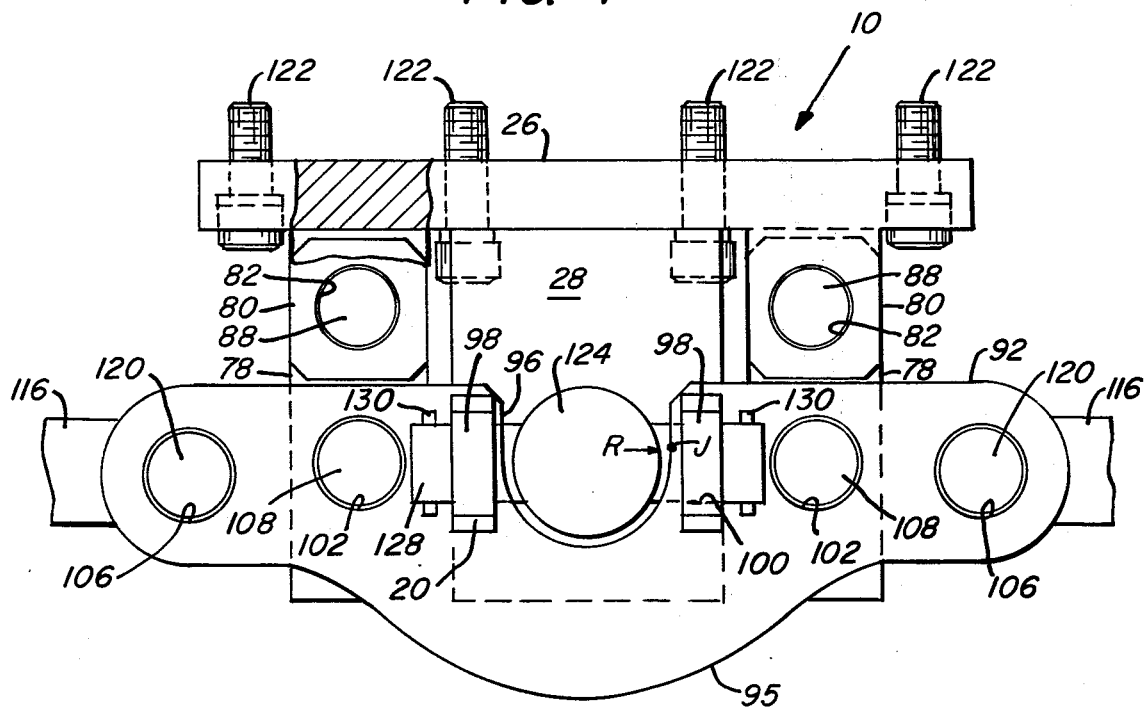
FIG. 4 is a reduced size longitudinal front elevational view, partly in section, of the torque indicating assembly taken on line 4—4 of FIG. 2.

With reference to FIG. 4 and with a torque indicating assembly 10 disposed intermediate a power tong 14 and a backup tong 16 as discussed hereinabove, the power tong 14 rotates to make up a threaded connection and the force indicated at R in FIG. 4 reacts on the right side of the U-shaped opening 96 at the point designated "J" thereby moving link plates 92 and 94 to the right about the respective pivot pins therefor. Because of the parallelogram established by the rigidly connected pivot pins 88 and 108, the movement of plates 92 and 94 results in the left hand pressure plate 78 pivoting inwardly to apply a force $R_1$, which is equal to the originally applied force R, at the left hand piston member 46. The force $R_1$ applied on piston member 46 will result in an increase in pressure in the hydraulic fluid within pressure chamber 70. This increase in pressure will be read from the meter or gage 74. As a convenience, meter 74 may have a dial face which reads directly in foot points rather than units of pressure thereby providing a direct reading of the torque applied by the power tong 14. When power tong 14 is breaking out rather than making a pipe joint the reactive forces and movements are directly opposite to those described above. It is to be noted that with the arrangement described above the initial force applied to torque assembly is a compressive force.

In instances where a power tong 14 is to be used without a backup tong 16 the applied force of the power tong 14 is resisted by suitable backup cables (not shown). The backup cables are suitably secured to the either right or left hand cable connection assemblies 110 through the respective lug bore 118 thereof. With such an arrangement where the power tong 14 is being used to make up a pipe section, a backup cable is secured to the right hand connection assembly 110. The reaction to the torque applied by the power tong 14 will be in the form of a tensile force (equal to R) in the backup cable. This tensile force will move link plates 92 and 94 to the right about the respective pivot pins therefor. This movement of link plates 92 and 94 will result in an applied force $R_1$ at the left hand piston member 46 in an identical manner as discussed hereinabove with reference to the power-backup tong operation. Once again the force $R_1$ applied on piston member 46 will result in an increase in pressure in the hydraulic fluid in chamber 70 which may be calibrated and read in foot-pounds.

It is to be understood that the invention herein is directed to a torque indicator assembly having improved long range consistency and operational characteristics as well as multiple use applications and modifications to the preferred embodiment described hereinbefore may be made by one skilled in the art without departing from the scope of the invention which is only defined by the claims appended hereto, for example: the torque indicator assembly may be used in other applications than with drilling tongs; various alterations may be made to connection assembly 20 and the means for connecting the cable; the pressure plates 78 may be pivotally connected in any suitable alternative manner; and the like.

What is claimed is:

1. A torque indicator assembly comprising:
a body member;
variable volume chamber means carried by said body member and operable to receive a fluid therewithin;
said chamber means having a pair of opposed oppositely biased movable portions;
force responsive means carried by said body member and operable to increase the pressure of the fluid within said chambers by moving one of said opposed portions when an external force is applied in a first direction and by moving the other of said opposed portions when such an external force is applied in a direction opposite said first direction;
said force responsive means including spaced portions pivotally carried by said body member and responsive to such an external force in a manner that one of said spaced portions pivot to move a first of said opposed portions while the other of said spaced portions simultaneously pivots in a direction away from the second of said opposed portions;
indicating means communicating with said chamber means and responsive to the pressure of the fluid within said chamber means;
and at least one link portion communicating between said spaced portions and pivotally carried thereby adjacent respective end sections of said link portion.

2. A torque indicator assembly as specified in claim 1 wherein the pivot axes for the pivotal connection of said spaced portions to said body member and the pivot axes for the pivot connections of said link portion to said spaced portions form a parallelogram 3. A torque indicator assembly as specified in claim 2 including cable connection means carried by said link portion.

4. A torque indicator assembly as specified in claim 3 wherein said link portion includes means thereon adapted to be connected to a torque resisting assembly 5. A torque indicating assembly as specified in claim 1 including:
a power tong fixably attached to said body member; and a back up tong connected to said link portion to transmit torques imposed on said opposed portion by said power tong.

6. A torque indicator assembly as specified in claim 5 with said indicating means operable to indicate the torque applied by said power tong.

7. A torque indicator assembly as specified in claim 5 including connection means thereon operable to be selectively connected to a backup cable.

8. a torque indicator assembly as specified in claim 7 with said indicating means operable to indicate the torque applied by said power tong by determining the tension within such a backup cable.

* * * * *

UNITED STATES PATENT OFFICE
CERTIFICATE OF CORRECTION

PATENT NO. : 4,050,300
DATED : September 27, 1977
INVENTOR(S) : J. Turner and R. A. McLaughlin It is certified that error appears in the above-identified patent and that said Letters Patent are hereby corrected as shown below:

In Column 5, line 52, delete "providinga" and insert --providing a--.

In Column 6, line 43, delete "pivot" and insert --pivots--.

In Column 6, line 58, insert a period at the end of Claim No. 2.

In Column 6, line 64, insert a period at the end of Claim No. 4.

Signed and Sealed this

Fifteenth Day of May 1979

[SEAL]

Attest:

RUTH C. MASON
Attesting Officer

DONALD W. BANNER
Commissioner of Patents and Trademarks